350-339    SR
OR  3,612,654

United States Patent  [11] 3,612,654

| [72] | Inventors | R... Edison; Sandor Caplan, Trenton, both of N.J. |
| [21] | Appl. No. | 40,788 |
| [22] | Filed | May 27, 1970 |
| [45] | Patented | Oct. 12, 1971 |
| [73] | Assignee | RCA Corporation |

[54] LIQUID CRYSTAL DISPLAY DEVICE
7 Claims, 4 Drawing Figs.

[52] U.S. Cl. .................................. 350/160 R, 40/52
[51] Int. Cl. ................................... G02f 1/28
[50] Field of Search ......................... 350/160

[56] References Cited
UNITED STATES PATENTS
3,257,903   6/1966   Marks ................. 350/267
...........   ...........   ams ..................... 350/160
3,499,112   3/1970   Heilmeier et al. ............ 350/160

FOREIGN PATENTS
1,123,117   8/1968   Great Britain ................

*Primary Examiner*—Ronald L. Wibert
*Assistant Examiner*—F. L. Evans
*Attorney*—Glenn H. Bruestle ABSTRACT: The device comprises a front transparent substrate having a transparent electrode on the inner surface thereof, a rear substrate, and a liquid crystal material disposed between the two substrates. The inside surface of the rear substrate is covered with a light-reflecting material, e.g., silver, covered in turn with a thin layer of dielectric material, e.g., silicon dioxide. Disposed on the dielectric layer is a patterned electrode of either a transparent material, e.g., tin oxide, or a light-reflecting material, e.g., silver.

INVENTOR.
Richard I. Klein &
Sandor Caplan
BY M.Y. Epstein
ATTORNEY

LIQUID CRYSTAL DISPLAY DEVICE

BACKGROUND OF THE INVENTION

This invention relates to liquid crystal display devices.

One form of liquid crystal device comprises a pair of spaced-apart substrates sandwiching a film of liquid crystal material therebetween. Electrodes are provided on the inside surfaces of the substrates, whereby an electric field can be applied through the liquid crystal film. With no applied field, the liquid crystal film is substantially transparent to light. With a field applied through the film, the film becomes forward scattering of light.

By patterning the electrodes on one or both surfaces, images, corresponding to the electrode patterns, can be provided. In one form of such devices, for example, the device has "front" and "rear" substrates, and the device is viewed from the front side thereof. The front substrate and the electrode on the inside surface thereof are transparent. The rear substrate is also transparent, having, however, a pattern of light-reflecting electrode segments on the inside surface thereof, and a light reflecting layer covering substantially all of the outside surface thereof. The light reflecting segments and layer have a similar mirrorlike appearance.

In use of the device, light is directed onto the device from the front side thereof, and voltages are applied to the various electrode segments to cause the portions of the liquid crystal film contiguous to the electrode segments to become light scattering. To a viewer, at the front side of the device, various luminous film portions, corresponding in shape to the electrode segments, appear on a mirrorlike background.

The purpose of the reflective layer on the outside surface of the rear substrate is to reflect light back to the viewer, thereby increasing the brightness of the displayed image. Also, the reflective layer, having the same mirrorlike appearance as the rear substrate electrodes, provides a uniform background into which these electrodes blend, thereby rendering the electrodes less noticeable to the viewer.

A problem with such devices, however, arises from the fact that the various electrode segments on the rear substrate cast shadows on the reflective surface of the rear substrate. These shadows, depending upon the angle of view of the display device, and the particular image being displayed, can be visible to the viewer through those portions of the liquid crystal film which remain transparent, and can be quite disruptive of the intended display effect. Also, the edges of the rear substrate electrodes, again depending upon the angle of view of the device, can be visible to the viewer, thereby further disrupting the intended effect.

While these particular problems can be avoided using transparent electrodes on the rear substrate, different problems are caused by such usage, i.e., owing to the transparency of these electrodes, the light from the luminous liquid crystal film portions in front of the electrodes can reach the rear reflective surface and be reflected forward. Again, depending upon the angle of view of the device, the view of the reflected luminous images can be quite distracting.

DESCRIPTION OF THE PREFERRED EMBODIMENTS

Reference is made to U.S. Pat. No. 3,322,485, issued to R. Williams on May 30, 1967, and U.S. Pat. No. 3,499,112, issued to G. H. Heilmeier et al. on Mar. 3, 1970. These patents show various prior art liquid crystal display devices, and provide numerous examples of liquid crystal materials suitable for use in such devices.

Figure 1:
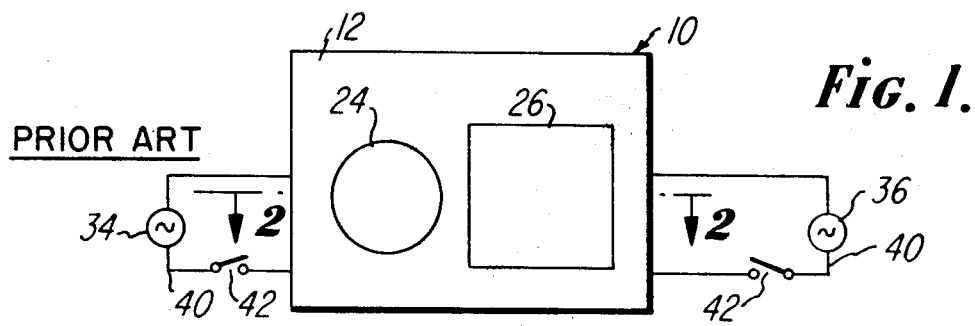
FIG. 1 is a front view of a prior art device.
Figure 2:
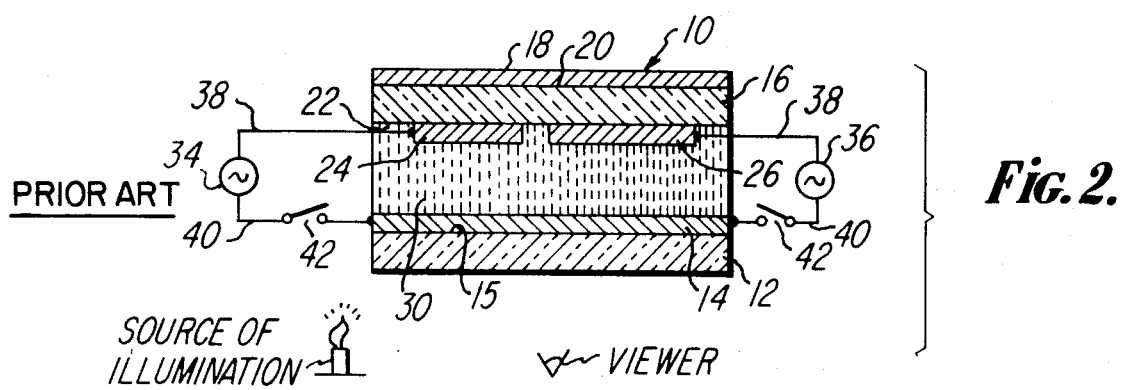
FIG. 2 is a section along line 2—2 of FIG. 1.

With reference to FIGS. 1 and 2 herein, an example of a prior art device is shown. The device 10 comprises a front transparent substrate 12 having a transparent electrode 14 covering the inside surface 15 thereof, and a rear transparent substrate 16 having a reflective coating 18, e.g., of aluminum, on the outside surface 20 thereof. On the inside surface 22 of the substrate 16 are a pair of reflective electrodes 24 and 26, e.g., of aluminum, each having the shape of an image to be displayed. Thus, the electrode 24 has the shape of a circle, and the electrode 26 has the shape of a square. A thin film 30 of a liquid crystal material is disposed between the two substrates. To provide adequate strength, the substrates 12 and 16, generally of glass, have a thickness in the order of 0.125 inch.

Two separate voltage sources 34 and 36 are connected one each to each of the electrodes 24 and 26, respectively, by means of leads 38, both sources 34 and 36 being connected to the electrode 14 on the front substrate 12 by means of a lead 40. Switches 42 are provided to allow selective application of the voltage sources 34 and 36 to the two electrodes 24 and 26.

In use, the device 10 is viewed from the front substrate 12 side of the device, and the device is illuminated from the same side, as indicated in FIG. 2. With the voltage source 34 connected to the electrode 24, and the voltage source 36 disconnected from the electrode 26, the portion of the liquid crystal film 30 disposed immediately in front of the electrode 24 is switched into the light-scattering mode. The remaining portions of the liquid crystal film 30 remain transparent. Owing to the light-scattering effect of the portion of the film 30 in front of the electrode 24, a luminous film portion having a circular shape corresponding to the shape of the electrode 24 becomes visible to the viewer. The image appears on a mirrorlike background.

Likewise, a luminous square is displayed when a voltage is applied between the electrode 26 and the electrode 14.

A problem with the described prior art device 10 is that although the reflective electrodes 24 and 26 tend to blend into the reflective coating 18 background and are substantially invisible, the shadows cast by the electrodes 24 and 26 on the coating 18 can be visible to the viewer depending upon the position of the viewer relative to these electrodes. The presence of such shadows can be quite detracting from the appearance of the display. Also, again depending upon the position of the viewer with respect to the electrodes 24 and 26, the edges of these electrodes can be noticeable, further detracting from the intended display effect.

Figure 3:
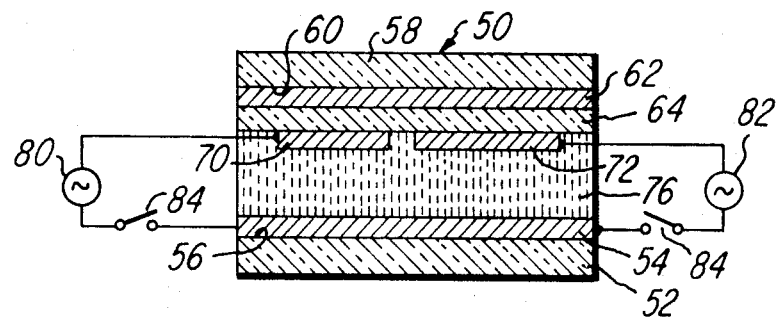
FIG. 3 is a sectional view of a device made according to the instant invention.

A display device 50 in accordance with the instant invention is shown in FIG. 3. The front view of the device 50 appears exactly as the front view of the prior art device shown in FIG. 1. The device 50 comprises a front transparent substrate 52 of, for example, glass, having a transparent electrode 54, e.g., of tin oxide, covering the inside surface 56 thereof. The device further comprises a rear substrate 58 of, for example, glass, which need not be transparent. Covering the inside surface 60 of the rear substrate 58 is a light reflective layer 62 of, e.g., aluminum or silver. Covering the layer 62 is a thin filmlike layer 64 of a transparent insulating material, e.g., silicon oxide, silicon dioxide, silicon nitride, chrome oxide, or the like. The layer 64 is preferably as thin as practical, being in the order of 2,000 A. Disposed on the layer 64 are a pair of electrodes 70 and 72 having the shape of a circle and a square, respectively. The electrodes 70 and 72 can be light reflecting in the direction towards the front substrate, being, e.g., of aluminum or silver, or can be transparent, e.g., of tin oxide. Disposed between the two substrates 52 and 58 is a thin film 76 of a liquid crystal material.

Two separate alternating voltage sources 80 and 82, and switch means 84 are provided, whereby a voltage can be selectively applied between the electrode 54 on the front substrate 52 and either or both of the electrodes 70 and 72.

In use, the device 50 is both illuminated and viewed from the front substrate 52 side of the device. By applying a voltage between the electrode 70 and the electrode 54, a luminous circle is displayed on a mirrorlike background. By applying a voltage between the electrode 72 and the electrode 54, a luminous square is displayed.

The close spacing between the reflective layer 62 and the electrodes 70 and 72 substantially completely eliminates the aforementioned problems of the prior art devices. Thus, for example, owing to the close spacing, the shadows cast by the electrodes 70 and 72, if opaque, are substantially invisible to the viewer regardless of the angle of view of the devices. I.e., short of viewing the device edge-on, the shadows are substantially hidden by the electrodes. Likewise, if the electrodes 70 and 72 are transparent, the reflection of the luminous images in front of the electrodes 70 and 72 from the reflective layer 62 appears substantially directly behind the electrodes 70 and 72 regardless of the angle of view of the device. Thus, the light reflection contributes to the image brightness without subtracting from the clarity thereof. Further, the edges of the electrodes 70 and 72, owing to the close spacing thereof to the background layer 62, are likewise less noticeable to the viewer.

The thickness of the insulating layer 64 is not critical. The thinner the layer 64, the better the results with respect to the appearance of the device. Generally, layer 64 thicknesses less than 2 mils are preferred. Since, in the instant embodiment, the layer 64 insulates the electrodes 70 and 72 from the reflective layer 62, practical limits as to the thickness of the layer 64 exist. With present techniques, for example, layers 64 of silicon dioxide at least in the order of 500 A. thickness are desired to provide adequate and reliable insulation, from device to device, between the reflective layer 62 and the electrodes 70 and 72.

Even thinner insulative layers 64 can be provided, however, using DC voltage sources. In such case, even if one of the electrodes 70 or 72 were shorted to the reflective layer 62 through an opening through the insulative layer 64, the DC voltage on the reflective layer 62 would have no effect on the liquid crystal film 76 except where the film 76 made direct contact with the reflective layer 62, e.g., through tiny pin holes through the layer 64. If not too numerous, such pin holes, appearing as tiny points of light on the display, are not overly distracting.

Figure 4:
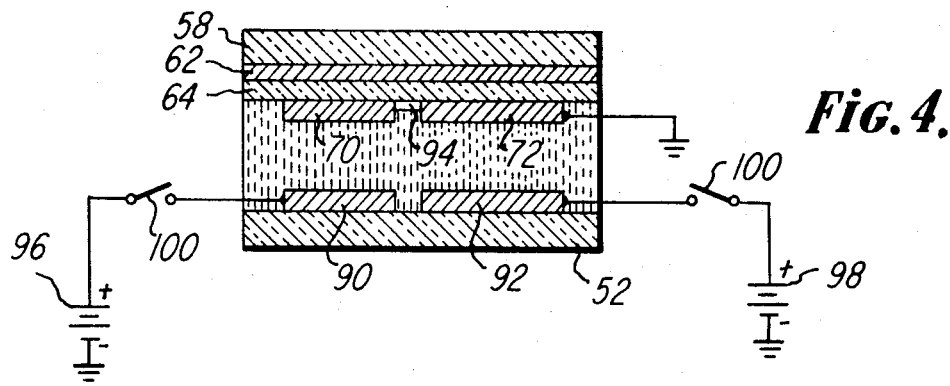
FIG. 4 is a view similar to that of FIG. 3 but showing another embodiment of the instant invention.

It is noted that, with the voltage switching means shown, a problem with the device 50 is that if the electrodes 70 and 72 are shorted to one another via the reflective layer 62 and pin holes through the insulator layer 64, the application of a voltage to either electrode will result in the display of both images, i.e., neither image could be individually displayed. In another embodiment, shown in FIG. 4, this problem is avoided. In this embodiment, the transparent electrode on the front substrate 52 is patterned into two segments 90 and 92 each corresponding in shape and being aligned with a different electrode 70 and 72, respectively. The electrodes 70 and 72 are electrically connected by means of a narrow conductive strip 94 on top of the insulating layer 64. Both electrodes 70 and 72 are connected to ground potential. Two DC voltage sources 96 and 98, each having a ground terminal, are each connected to a different electrode segment 90 and 92, respectively, through switches 100.

In operation, either a square or circular image, or both, is displayed upon the application of a voltage to the appropriate segment 90 or 92, or both. The presence of the strip 94 has no effect on the liquid crystal film because there is no electrode on the substrate 52 opposite thereto. I.e., a projection of the strip 94 onto the substrate 52 does not intercept any portion of the electrode thereon.

In general, it is noted, the electrodes on the two substrates 52 and 58 need not correspond in configuration to one another. This is because the liquid crystal film 76 is activated only where the electrodes on the two substrates overlap one another, whereby the image displayed is defined solely by the electrode segments on the two substrates which overlap one another. The nonoverlapping segments, such as the connector 94 shown in FIG. 4, can be used as voltage terminals or segment connectors, or the like, while not affecting the displayed image.

Also, while not shown, the transparent electrode on the front substrate can be disposed on the outside surface of the front substrate. Likewise, the laminate comprising the reflective layer 62, the insulator film 64, and the electrodes 70 and 72 can be disposed, in the order named towards the front substrate (i.e., the electrodes 70 and 72 are closest to the front substrate), on the outside surface of the rear substrate. In such embodiments, the various electrodes are not in direct contact with the liquid crystal film 76, being spaced therefrom by the substrates, and an alternating voltage is required to activate the film 76 by capacitive coupling through the substrates.

Further, while the invention has been described in connection with liquid crystal material which is normally transparent when not activated, i.e., without an electric field or current therethrough, the invention can be used with liquid crystal material which is normally light scattering but which becomes less light scattering and more transparent when activated.

We claim:
1. A liquid crystal device comprising:
   a front transparent substrate, a rear substrate, and a crystal material therebetween,
   a transparent first electrical conductor on said front substrate,
   a laminate disposed on said rear substrate and comprising, in the named order towards said front substrate, a light reflector for reflecting light in the direction of said front substrate, a thin film insulator, and a second electrical conductor,
   at least portions of said first and second conductors overlapping one another.

2. A device as in claim 1 wherein said first electrical conductor is disposed on the inside surface of said front substrate, and said laminate is disposed on the inside surface of said rear substrate.

3. A device as in claim 2 wherein said second conductor is transparent.

4. A device as in claim 2 wherein said second conductor is light reflective towards said front substrate.

5. A device as in claim 2 wherein said second conductor comprises two electrically isolated segments.

6. A device as in claim 2 wherein said first conductor comprises two electrically isolated segments, and said second second conductor two electrically connected segments.

7. A device as in claim 6 including a connector means disposed on said insulator connecting said second conducting segments,
   a projection of said connector means onto said first substrate not intercepting any portion of said first conductor thereon.